United States Patent [19]

Rappinger et al.

[11] Patent Number: 4,618,963
[45] Date of Patent: Oct. 21, 1986

[54] DIRECT CURRENT ARC FURNACE

[75] Inventors: Bo Rappinger; Sven-Einar Stenkvist, both of Västerås, Sweden

[73] Assignee: Asea AB, Västerås, Sweden

[21] Appl. No.: 693,165

[22] Filed: Jan. 22, 1985

[30] Foreign Application Priority Data

Jan. 25, 1984 [SE] Sweden ............... 8400367

[51] Int. Cl.⁴ .............................................. H05B 7/00
[52] U.S. Cl. ...................................... 373/72; 373/108
[58] Field of Search ................... 373/72, 108, 71, 107, 373/75, 44, 45, 85

[56] References Cited

U.S. PATENT DOCUMENTS 3,218,050 11/1965 Healy et al. ............................ 373/72
4,228,314 10/1980 Stenkvist .............................. 373/72
4,541,099 9/1985 Rappinger et al. ................... 373/72

Primary Examiner—Roy N. Envall, Jr.
Attorney, Agent, or Firm—Kenyon & Kenyon

[57] ABSTRACT

A DC arc furnace having an electrically conductive hearth adapted to contain a melt, and at least one arcing electrode above the hearth and adapted to form a heating arc with the melt when the hearth and electrode are supplied with DC power; the hearth having a wear lining directly contacted by the melt and formed by refractory material through which electrical conductors extend from the bottom of the wear lining to its top. A metal plate under the wear lining electrically connects with the conductors and is supported by one or more electrically non-conductive layers of refractory. Power connection to the wear lining is via the plate and a connection with the periphery of the plate.

2 Claims, 1 Drawing Figure

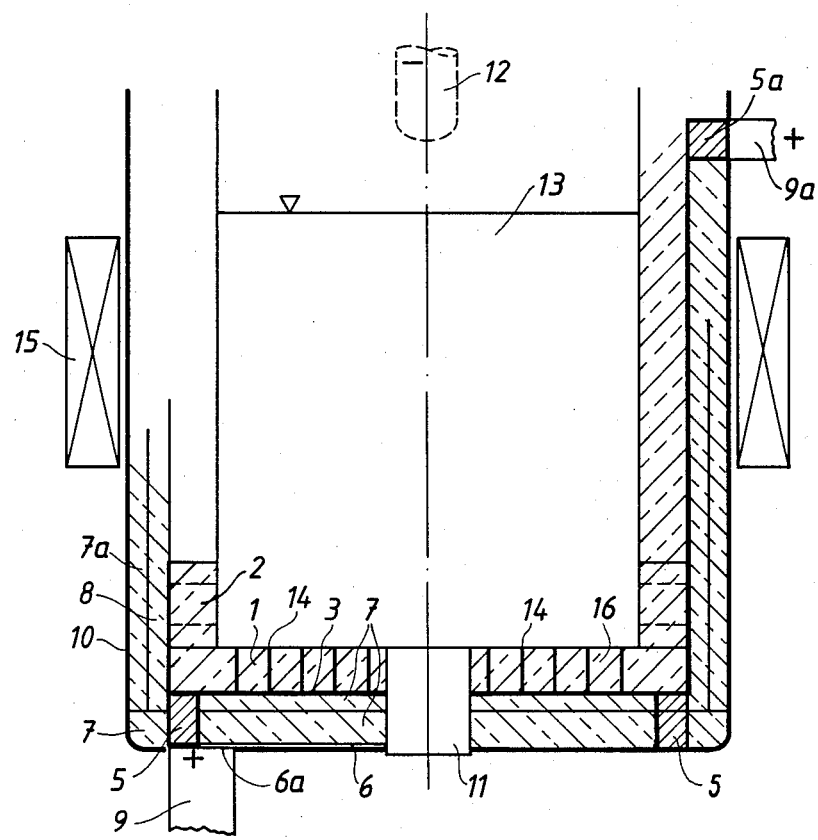

DIRECT CURRENT ARC FURNACE

BACKGROUND OF THE INVENTION

DC arc furnaces having electrically conductive hearths are disclosed by the Stenkvist U.S. Pat. No. 4,228,314 and the Stenkvist and Rappinger U.S. Pat. No. 4,324,943.

The hearth of such a furnace is adapted to contain a melt of molten metal, the furnace having at least one arcing electrode with a tip positioned above the hearth and adapted to form a heating arc with the melt when the electrode and hearth are supplied with DC power.

In the patents, the hearth comprises a wear lining directly contacted by the melt and formed by refractory material through which electrical conductors extend from the bottom of the wear lining to the top for contact with the melt. Superimposed layers of electrically conductive bricks are laid beneath the wear lining and connect the bottom portions of the conductors with a metal conductor plate below and in electrical connection with the bottom layer of the electrically conductive bricks. The metal plate is adapted to be connected with the DC power circuit including the arcing electrode.

In U.S. Pat. No. 4,228,314 the refractory material through which the electrical conductors extend is formed by a refractory compound rammed on the conductive bricks with the conductors formed by metal rods extended through the compound. In U.S. Pat. No. 4,324,943 the refractory compound is formed by bricks through which the electrical conductors extend, or metal encased bricks may be used.

The electrical conductors used with either of the refractory materials, rammed compound or bricks, the electrically conductive bricks and the metal plate, are not only good electrical conductors as required for the arc's power circuit but are also correspondingly good thermal conductors. Consequently the heat of the melt heated by the arc is to a high degree transmitted to the metal plate. This can result in excessive heating of the metal plate and therefore the furnace bottom.

According to the Rappinger and Stenkvist application Ser. No. 601,348, filed Apr. 17, 1984, now U.S. Pat. No. 4,541,099, the layers of the electrically conductive bricks beneath the wear lining have an interposed layer in part of bricks of high electrical and thermal conductivity and in part of bricks of low electrical and therefore low thermal conductivity, the bricks being mixed and laid together to form the layer. The two kinds of bricks are laid to provide a spread distribution of the electrically conductive bricks interposed by the bricks of low conductivity. The distribution of bricks in the layer is such as to provide adequate electrical conductivity between the conductive brick layers but with the thermal conductivity substantially decreased by the presence of the bricks of low conductivity. This results in a substantial reduction in the temperature of the metal plate when the furnace is in operation.

This U.S. Pat. No. 4,541,099 further discloses a ladle furnace having DC arc heating with a hearth having a wear lining comprising a steel plate shell in the form of a cup having steel pins welded to it and extending inwardly with non-conductive refractory material rammed around the pins to form the wear lining as a unit. This lining can be made outside of the ladle and installed inside of the ladle during the ladle construction or repair. This wear lining unit rests on the electrically conductive brick layers with the layer of mixed bricks. With possibly other layers this hearth has the conductor plate beneath everything, the power being transmitted from the plate through the various conductive layers and steel plate shell to the hearth's electrically conductive wear lining.

In all of these previous proposals the hearth construction must be of undesirably vertical thickness to prevent overheating of the connector plate. This results in a furnace of undesirably large size.

SUMMARY OF THE PRESENT INVENTION

The present invention provides a substantial reduction in the vertical height or thickness of the hearth and therefore the overall extent or size of the furnace. Using the steel plate cup concept previously mentioned above, for the wear lining unit, the bottom of the cup is supported throughout its extent by electrically non-conductive refractory bricks or the like. Being electrically non-conductive the insulation beneath the bottom of the cup is also thermally non-conductive to the maximum degree possible. Consequently, the vertical height or thickness of the hearth can be substantially reduced with safety.

To get the power to the wear lining a unique electrically conductive ring encircles the electrically non-conductive material below the cup's bottom and the periphery of this bottom rests on the ring connector. This ring connector is radially beyond the inner surface of the wear lining and where relatively low temperatures occur. This ring connector is provided with a terminal outside of the furnace bottom so as to be electrically powered. If the steel plate cup is extended upwardly to above the level of the melt in the furnace the ring connector can connect with the top rim of this vertically extended cup, a location where there is even less heat. In either case the ring connector can be made of an electrically conductive refractory such as carbon, graphite or electrically conductive bricks. The ring can be circumferentially continuous or formed by circumferentially interspaced ring segments.

DESCRIPTION OF THE DRAWING

The accompanying is a schematic vertical section of a ladle arc furnace embodying the present invention.

DETAILED DESCRIPTION OF THE INVENTION

This schematic drawing shows the wear lining 1 and its upstanding wall 2 which results from the use of the steel plate shell 3 in the form of a cup. The flat part 1 of the wear lining is of course circular, the side wall 2 consequently being cylindrical. The bottom of the steel cup 3, which is essentially in the form of a flat circular disc or plate, is shown with its periphery resting on the annular ring connector 5. The ladle's outer steel shell 6 is interrupted at 6a so as not to contact the bottom of the ring connector 5, and radially outwardly this connector 5 is separated from the steel ladle shell by a ring of electrically non-conductive refractory 7, the upstanding wall of the steel cup being separated from the ladle shell by layers of electrically non-conductive refractory 7a and 8. These layers are interspaced between the ladle's steel shell side wall 10 and the upstanding wall of the steel cup 3. The external connector 9 can be made of copper of high electrical conductivity and connected with the annular ring connector 5.

The ladle's tap hole 11 is shown without its normal remotely controlled valve mechanism. On the left-hand side of the drawing the hearth's side wall does not extend for the full height of the ladle, whereas on the right-hand side of the drawing the cup's wall is shown as extending upwardly to above the level of the melt 13. In this case the annular ring connector 5a can be positioned above the area of maximum ladle heat. However, if the ladle is to use an electromagnetic stirrer for this melt, a stirrer 15 being indicated, the upwardly extended cup side wall interferes. Such interference is avoided by the use of the shorter upstanding cup side wall shown on the left-hand side of the drawing. Either cup side wall height may be used when the arcing electrode 12 and hearth are powered, respectively usual by cathodically and anodically.

The hearth lining of the cup can be made as disclosed by either of the previously mentioned patents, the drawing illustrating the use of steel pins 14 welded to the inside of the steel cup, refractory material 16 being rammed around the pins as suggested by U.S. Pat. No. 4,228,314 excepting that in the present instance there is no electrically conductive material below other than for the steel plate shell bottom. In the case of the upstanding wall portion 2 the suggestions disclosed by U.S. Pat. No. 4,324,943 can be followed and are appropriate.

The annular or ring connector 5 can be made from graphite bricks, magnesite-graphite bricks, bricks containing graphite or metal encased bricks. The electrically and thermally non-conductive layers can be dry rammed magnesite compound, chammote bricks, etc. as indicated by current furnace making techniques.

Instead of being in the form of a steel cup for the wear lining material, a circular flat steel plate can be used as the backing for the wear lining. The wear lining on the steel plate can be constructed as disclosed by either of the previously mentioned patents.

What is claimed is:

1. A DC arc furnace having an electrically conductive hearth adapted to contain a melt, at least one arcing electrode above the hearth and adapted to form a heating arc with the melt when the hearth and electrode are supplied with DC power; the hearth having a wear lining directly contacted by the melt and formed by refractory material through which electrical conductors extend from the bottom of the wear lining to its top, a metal plate under the wear lining and substantially coextensive therewith and connected to the electrical conductors, a layer of refractory on which the bottom of said plate rests, said layer having a periphery formed by electrically conductive refractory in electrical contact with the plate's periphery and radially inwardly thereof being formed by electrically non-conductive refractory providing thermal insulation under the plate, and means for connecting said electrically conductive refractory with electric power.

2. The furnace of claim 1 in which said electrically conductive refractory forms a ring which encircles said electrically non-conductive refractory, and said ring is itself encircled by electrically non-conductive refractory.

* * * * *